March 13, 1956 J. J. TEPAS, JR 2,738,323
CHEMICAL FEEDER
Filed July 10, 1952
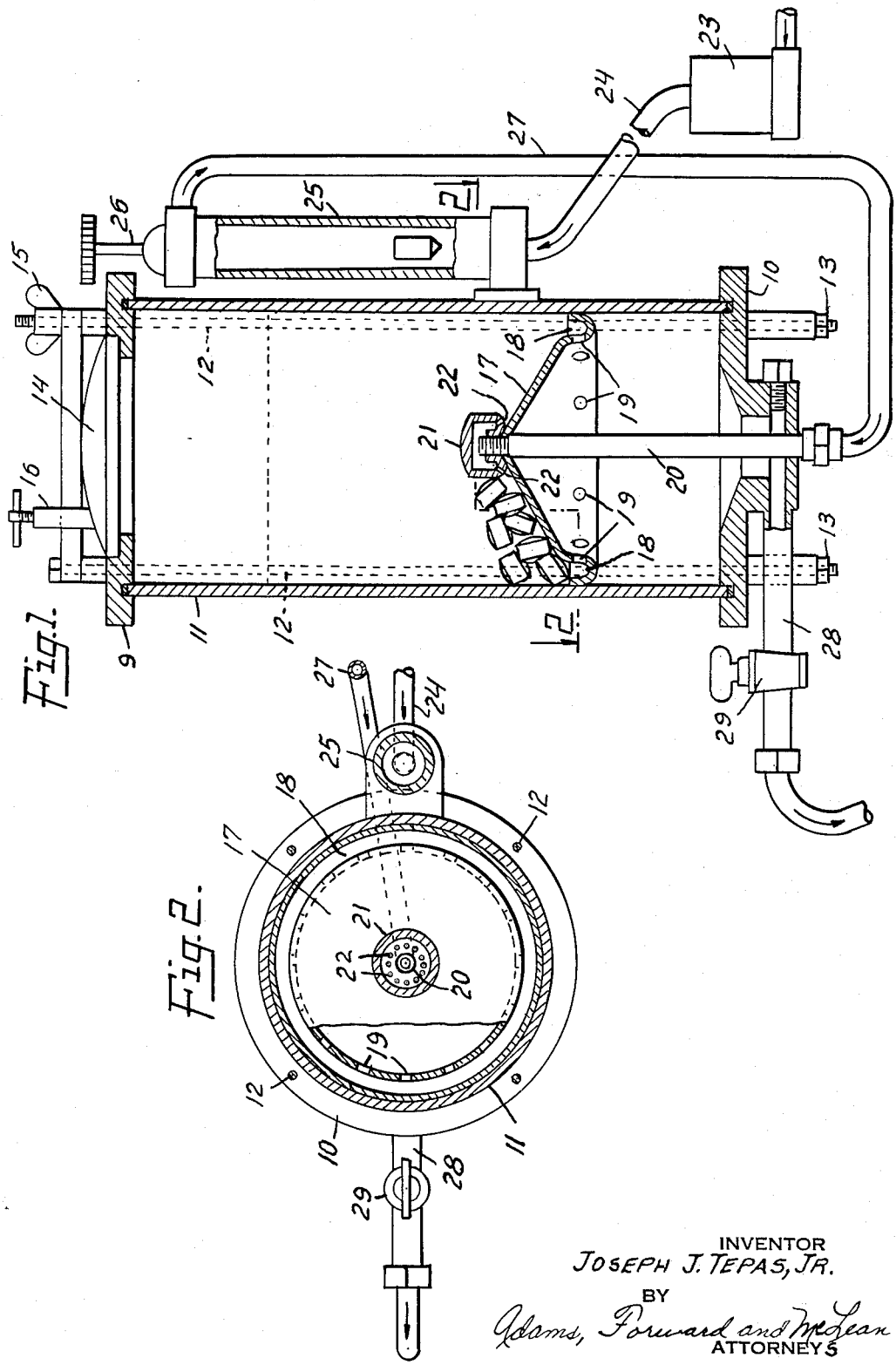
INVENTOR
JOSEPH J. TEPAS, JR.
BY
Adams, Forward and McLean
ATTORNEYS

United States Patent Office 2,738,323
Patented Mar. 13, 1956

2,738,323

CHEMICAL FEEDER

Joseph J. Tepas, Jr., Baltimore, Md., assignor to Olin Mathieson Chemical Corporation, a corporation of Virginia Application July 10, 1952, Serial No. 298,091

1 Claim. (Cl. 210—28)

This invention relates to apparatus for the preparation and controlled feeding of aqueous solutions of solid particulate materials. More particularly, the apparatus permits preparation and feeding of such solutions at extremely low rates of feed. Still more particularly, this invention relates to apparatus for supplying solutions of low available chlorine concentrations from hypochlorite in conveniently handled pressed or tabletted form at accurately controlled rates for consumption in a variety of chlorination and water treating applications differing widely in the ultimate concentration of solution required.

In the treatment of water supplies, a supply of aqueous solution of a hypochlorite is commonly metered into a flowing body of the liquid to be treated. Such practice requires the purchase of solutions of hypochlorite or requires the preparation of a stock solution from a dry hypochlorite at the point of use. For example, sodium hypochlorite known in the solid state only as the pentahydrate, a very unstable compound, is prepared commercially as solutions not exceeding 15 per cent available chlorine, which solutions deteriorate quickly during shipment and storage and are generally available only in the vicinity of plants in which they are prepared. Calcium hypochlorite, on the other hand, particularly in the form of high-test hypochlorite, can be shipped as a relatively stable solid containing 70 per cent or more of available chlorine and may be conveniently stored for long periods of time without appreciable loss of available chlorine.

In spite of the above and other advantages of solid calcium hypochlorite for use as a sterilizing agent, there is the problem of applying the solid directly in such a manner that only a few parts per million of available chlorine will ultimatey be present in the water or other liquid to be treated, which remains the chief reason for the continued use of sodium hypochlorite solutions. In the conventional method of application, for example to the circulating system of swimming pools, the solid calcium hypochlorite is dissolved in water to form a supply or stock solution of desired concentration which is metered by a sensitive metering device into the circulating system at a rate that will maintain residual chlorine of 0.3 to 0.6 p. p. m. in the pool. However, in the conventional method of application there is the difficulty of sludge formation in making up the stock solutions. The presence of sludge in the hypochlorite solutions tends to clog the sensitive metering devices necessary to supply the calcium hypochlorite solution in small amounts to the body of liquid to be treated. Consequently, it is often necessary to filter or otherwise separate the sludge from the calcium hypochlorite solution prior to passing the solution through the metering device.

With the apparatus of my invention a material in solid particulate form, such as calcium hypochlorite, may be effectively and continuously dissolved at variable but accurately controllable rates and the resulting solutions covering a wide range of available chlorine concentrations may be supplied without further treatment to the point of ultimate consumption, such as a flowing liquid system. Control over the rate at which the solute is fed to the system is essentially provided by accurate control over the rate at which the dissolving water is brought into contact with the solid particulate material and control over the period of contact between the solid particulate material and the dissolving water.

In general the apparatus of the present invention comprises a vertically enlarged container with an upper opening for charging the solid hypochlorite and a lower opening for withdrawing aqueous hypochlorite, a cone support for a bed of the solid hypochlorite having a trough around its lower circumference and a plurality of openings in the trough, said support being arranged within the lower portion of said container and above its base, water distributing means adapted to direct fine streams of water downwardly to contact the conical support prior to contact with the solid hypochlorite, water inlet means for supplying to said water distributing means, means for metering variable amounts of water to said water inlet means, and means for withdrawing and dispensing aqueous hypochlorite solution of desired concentration from said lower opening. Advantageously, the openings in the trough around the conical support are in the inner edge of the trough so that small hypochlorite particles are retained in the trough until they dissolve. Also advantageously the water inlet means extends upwardly through the apex of the conical support, simplifying removal for cleaning of the water distributing means and conical support.

In operation water is metered at an accurately controllable but variable rate to the distributing means, such as a distributor nozzle threaded onto the water inlet pipe, and is injected downwardly as a plurality of small streams in order to contact the conical support before contacting the hypochlorite tablets. The water flows down the conical support contacting the tablets resting on the support and flows out of contact with the tablets into the circumferential trough and through the holes in the trough into the chamber between the conical support and the base of the container. The hypochlorite solution passes through the lower opening in the container, through the dispensing means and into the flowing liquid to be treated. The bed of calcium hypochlorite charge in the container is replaced as dissolved by the charge descending by its own weight from the upper section of the container.

Thus the apparatus of the present invention provides means for dissolving a solid particulate material, such as calcium hypochlorite in tableted form, at variable but accurately controllable rates at which available chlorine is required for treatment of water and obviates the necessity of preparing large quantities of stock solutions of hypochlorite. Moreover, the apparatus of the present invention has the important advantage of permitting control of the flow rate of the hypochlorite solution into the body of liquid to be treated by metering the water instead of by metering the hypochlorite solution. The problem of sludge removal to prevent clogging of the metering equipment is thereby eliminated since the hypochlorite solution flows freely into the body of liquid to be treated where any suspended matter carried with it is completely dissolved. In addition, with my apparatus it is possible to make remarkably accurate calibration curves which transfer rate of water flow to rate of chlorine feed.

In any system where water is supplied under pressure, or is being circulated by a pump, the installation of the present apparatus requires only a connection for the inflow water to the high pressure side of the system and a connection for introducing the resulting solution at a low pressure point in the system.

A useful feeder exemplifying my invention is illustrated somewhat diagrammatically in the accompanying drawings in which:

Fig. 1 is a vertical cross-section of a feeder employing the principles of my invention.

Fig. 2 is a view taken at line 2—2 of Fig. 1 showing the device utilized for introducing and distributing the water into the bed of hypochlorite, for example calcium hypochlorite.

The arrangement shown in the accompanying drawings was designed to best suit the needs of a specific application and is in no way meant to express or imply a limitation or restriction on the design.

As Fig. 1 shows, the apparatus consists of a top 9, bottom 10, and center section 11, which are held together by tie-rods 12 and nuts 13. A lid 14 held firmly in place by wing nut 15 and conveniently provided with a vent 16 affords a convenient means of charging the chemical through the top 9. Arranged within the lower portion of center section 11 are a cone support 17 having a trough 18 around the lower circumference thereof with openings 19 within the inner edge of trough 18, water inlet pipe 20 extending upwardly through the apex of conical support 17, and distributor head 21 with downwardly directed openings 22 set on water inlet pipe 20. Advantageously, the cone support has a slope of about 30° from the horizontal and contains from about 4 to about 24 openings of 1/8-inch or larger in the inner edge of trough 18. Also advantageously, distributor head 21 has from about 3 to about 24 holes of No. 70 drill or larger for openings 22.

In operation, water is advantageously filtered through a suitable strainer 23 and supplied to the feeder through line 24, at a rate which is measured by a flowmeter 25 controlled by a suitable needle valve 26. Alternatively, a by-pass line (not shown) containing a valve may advantageously be provided in water line 24. The by-pass line divides the flow of water to the feeder so that one portion is passed into the tablet bed at a rate controlled by the needle valve 26 and measured by flowmeter 25 while the other portion is passed directly into the lower chamber between the conical support 17 and the feeder bottom 10 at a rate controlled by the by-pass line valve. The rate of chlorine dosage depends entirely upon the setting of the flowmeter control valve 26. Since the water passed through the by-pass line does not contact the hypochlorite tablets, it serves solely to dilute within the lower chamber of the center section 11, the hypochlorite solution being formed by the metered water. By increasing the rate of flow and reducing the concentration of the discharged solution, the by-pass line eliminates or greatly reduces any possibility of plugging. It also provides the user with a means of adjusting the available chlorine concentration of the hypochlorite solution which passes through the solution discharge stopcock 29 built into the base of the unit and through the solution discharge hose to the point of application.

The water from flowmeter 25 is passed through line 27 and inlet pipe 20 to distributor head 21 from which it is injected through openings 22 onto conical support 17 before contacting the hypochlorite tablets resting on conical support 17. The water flows down the conical support contacting only the tablets resting on the support and flows out of contact with the tablets into circumferential trough 18, through openings 19 and into the chamber between the conical support and the bottom of the feeder in which a back flow of solution may accumulate without permitting the wetting of the bulk of the hypochlorite tablets in the feeder. From this chamber the solution is fed through line 28 with stopcock 29 to the point of application.

The design principles of the present invention can generally be used advantageously when it is desired to dispense solutions of chemicals supplied in solid particulate form at accurately controlled rates which may be varied simply by controlling the solvent input rate. It is particularly useful in the application of solid hypochlorite, for example calcium hypochlorite, to bodies of moving liquids such as, for example, in treating water of swimming pools, water plants in small municipalities, bottling plants, dairies, cooling systems, etc., where the addition of a sterilizing agent is desirable. It also can be advantageously used in the treatment of industrial wastes to destroy color, odor, and toxic constituents, and for odor and bacterial control in sewage effluents. Pressed tablets of hypochlorite are especially suitable in the present apparatus, but other shapes and sizes of particles may also be used. The apparatus is adaptable for dissolving and feeding other chemicals, for example, sodium fluoride in minor amounts for water supplies, polyphosphates and compositions containing them for water softening, soda ash furnished as briquettes or fused soda ash for adjusting the alkalinity of a treating solution, etc.

The materials of construction in contact with the solid or solutions of hypochlorite, for example calcium hypochlorite, are preferably resistant to its action. Particularly suitable for this purpose are a considerable number of plastic compounds such as, for example, Lucite which has the additional advantage of transparency. Other portions of the apparatus may be constructed of molded resins and of conventional materials including copper, brass, steel, etc.

The apparatus of the present invention can be fabricated at low cost compared to other dispensing equipment. It is of compact construction, can be quickly installed, requires a minimum of maintenance, is safe to use and involves no accident hazards. It requires the preparation of no stock solutions of the chemicals used. Once charged and set it can be depended upon to operate reliably without further attention until the charge of solid chemical is spent. With a suitable metering device controlling the inflow of water, the degree of treatment can be varied over wide limits and can be changed quickly to accommodate fluctuations in demand.

A particular advantage of the apparatus of the present invention is that it is capable of supplying chlorine feed rates of at least as low as 0.005 pound per hour. Previous feeders utilizing solid materials and which are capable of providing constant and closely controllable feeds generally have a lower limit considerably above that obtainable with the device of the present invention. For example, with tabletted calcium hypochlorite, minimum feeds of about 0.1 pound of available chlorine per hour may be obtained with cold water and 0.25 pound per hour with water at 86° F. A chlorine feed rate of 0.1 pound per hour requires a flow rate of 200 gallons per minute to give a dosage of 1 part per million of available chlorine. A feed rate of 0.25 pound per hour requires a flow rate of 500 gallons per minute to provide the same dosage. A feed rate of 0.005 pound per hour will treat a flow of 10 gallons per minute, providing 1 part per million of available chlorine. Under favorable conditions even lower feed rates may be obtained. This extremely low chlorine feed rate is particularly surprising when compared to the relatively high feed rates of conventional feeders. Moreover, as the high water flow rate required for the high chlorine feed rate of conventional feeders cannot be used for many applications the device of the present invention is therefore suitable for many applications requiring low water flow rates and low chlorine feed rates.

I claim:

Apparatus for preparing and feeding aqueous hypochlorite solutions at controlled rates from solid hypochlorite which comprises a vertically elongated container having an upper opening for charging solid hypochlorite and having a lower opening for withdrawing aqueous hypochlorite, a cone support for a bed of the solid hypochlorite, said cone support being positioned so that its largest circumference is about its base, a trough around the outside of the lower circumference of said cone and a plurality of openings in the trough, said support being arranged in the lower portion of said container and above its base, water distributing means adapted to direct fine streams of water downwardly in contact with the conical support prior to contact with the solid hypochlorite, water inlet means for supplying water to said water distributing means, means for metering variable amounts of water to said water inlet means, and means for withdrawing and dispensing aqueous hypochlorite solution of desired concentration from said lower opening.

References Cited in the file of this patent

UNITED STATES PATENTS

| | | |
|---|---|---|
| 528,441 | Muller | Oct. 30, 1894 |
| 745,472 | Adams, Jr. | Dec. 1, 1903 |
| 1,058,113 | Stuckel | Apr. 8, 1913 |
| 1,409,248 | Sevcik | Mar. 14, 1922 |
| 2,063,131 | Siems | Dec. 8, 1936 |
| 2,551,494 | Kaufmann | May 1, 1951 |

FOREIGN PATENTS

| | | |
|---|---|---|
| 6,632 | Great Britain | 1895 |
| 10,394 | Great Britain | 1910 |
| 57,265 | Germany | Oct. 23, 1890 |